United States Patent
Baleine et al.

(10) Patent No.: US 9,908,808 B1
(45) Date of Patent: Mar. 6, 2018

(54) TERNARY GLASS MATERIALS WITH LOW REFRACTIVE INDEX VARIABILITY

(71) Applicants: LOCKHEED MARTIN CORPORATION, Bethesda, MD (US); University of Central Florida Research Foundation, Inc., Orlando, FL (US)

(72) Inventors: Clara Rivero Baleine, Orlando, FL (US); Benn H. Gleason, Tucson, AZ (US); Kathleen A. Richardson, Geneva, FL (US); Jeffrey Linn Ruckman, Orlando, FL (US)

(73) Assignees: Lockheed Martin Corporation, Bethesda, MD (US); University of Central Florida Research Foundation, Inc., Orlando, FL (US)

( * ) Notice: Subject to any disclaimer, the term of this patent is extended or adjusted under 35 U.S.C. 154(b) by 15 days.

(21) Appl. No.: 15/240,975

(22) Filed: Aug. 18, 2016

(51) Int. Cl.
C03C 3/32 (2006.01)
C03B 25/02 (2006.01)

(52) U.S. Cl.
CPC ............. *C03C 3/321* (2013.01); *C03B 25/02* (2013.01)

(58) Field of Classification Search
CPC .................................................... C03C 3/321
See application file for complete search history.

(56) References Cited

U.S. PATENT DOCUMENTS

| | | |
|---|---|---|
| 3,362,797 A | 1/1968 | Shaskolskaja et al. |
| 3,825,317 A | 7/1974 | Inoue et al. |
| 4,209,229 A | 6/1980 | Rittler |
| 4,635,082 A | 1/1987 | Domoto et al. |
| 4,867,544 A | 9/1989 | Bornstein et al. |
| 5,102,694 A | 4/1992 | Taylor et al. |
| 5,166,827 A | 11/1992 | Noda |
| 5,171,344 A | 12/1992 | Noda |
| 5,200,858 A | 4/1993 | Hagerty et al. |
| 5,236,486 A | 8/1993 | Blankenbecler et al. |
| 5,245,328 A | 9/1993 | Garrett |
| 5,254,454 A | 10/1993 | Mimiya et al. |
| 5,262,896 A | 11/1993 | Blankenbecler |
| 5,294,240 A | 3/1994 | Sanghera et al. |
| 5,336,643 A | 8/1994 | Goto et al. |
| 5,349,473 A | 9/1994 | Kurasawa et al. |
| 5,448,409 A | 9/1995 | Noda |
| 5,459,613 A | 10/1995 | Xu |
| 5,537,505 A | 7/1996 | Borrelli et al. |
| 5,608,568 A | 3/1997 | Blodgett et al. |
| 5,731,906 A | 3/1998 | Morita |
| 5,796,525 A | 8/1998 | Dempewolf et al. |
| 5,867,264 A | 2/1999 | Hinnrichs |
| 5,917,105 A | 6/1999 | Xu et al. |
| 6,027,672 A | 2/2000 | Weitzel et al. |
| 6,236,493 B1 | 5/2001 | Schmidt et al. |
| 6,362,118 B1 | 3/2002 | Beall et al. |
| 6,519,975 B1 | 2/2003 | Bange et al. |
| 6,570,784 B2 | 5/2003 | Lowrey |
| 6,586,474 B2 | 7/2003 | Webber et al. |
| 6,586,761 B2 | 7/2003 | Lowrey |
| 6,673,497 B2 | 1/2004 | Efimov et al. |
| 6,687,153 B2 | 2/2004 | Lowrey |
| 6,760,526 B2 | 7/2004 | Ellison et al. |
| 6,819,469 B1 | 11/2004 | Koba |
| 6,908,812 B2 | 6/2005 | Lowrey |
| 6,959,753 B1 | 11/2005 | Weber et al. |
| 7,005,665 B2 | 2/2006 | Furkay et al. |
| 7,119,353 B2 | 10/2006 | Lankhorst et al. |
| 7,148,164 B2 | 12/2006 | Minamikawa et al. |
| 7,164,818 B2 | 1/2007 | Bryan et al. |
| 7,173,767 B2 | 2/2007 | Satzke |
| 7,208,133 B2 | 4/2007 | Cho et al. |
| 7,315,683 B2 | 1/2008 | Beall et al. |
| 7,326,500 B1 | 2/2008 | Glebov et al. |
| 7,405,883 B2 | 7/2008 | Hashimoto |

(Continued)

FOREIGN PATENT DOCUMENTS

JP          63222041 A  *  9/1988

OTHER PUBLICATIONS

Jared, David A. et al., "Electrically addressed spatial light modulator that uses a dynamic memory," Optics Letters, vol. 16, No. 22, Nov. 15, 1991, Optical Society of America, pp. 1785-1787.

Jiang, Lijun et al., "Design, fabrication and testing of a micromachined thermo-optical light modulator based on a vanadium dioxide array," Journal of Micromechanics and Microengineering, vol. 14, No. 7, May 13, 2004, IOP Publishing Ltd., pp. 833-840.

Siegel, J. et al., "Rewritable phase-change optical recording in $Ge_2Sb_2Te_5$ films induced by picosecond laser pulses," Applied Physics Letters, vol. 84, Issue 13, Mar. 29, 2004, American Institute of Physics, 4 pages.

Verleur, Hans W. et al., "Optical Properties of $VO_2$ Between 0.25 and 5 eV," Physical Review, vol. 172, No. 3, Aug. 15, 1968, pp. 788-798.

Richardson et al., "Engineering Novel Infrared Glass Ceramics for Advanced Optical Solutions," SPIE 9822, Advanced Optics for Defense Applications: UV through LWIR, 9822-4, Apr. 17, 2016, retrieved from http://www.creol.ucf.edu/Research/Publications/10758.pdf, 24 pages.

(Continued)

*Primary Examiner* — Elizabeth A. Bolden
(74) *Attorney, Agent, or Firm* — McDermott Will & Emery LLP

(57) ABSTRACT

Ternary chalcogenide glass materials containing germanium can display enhanced properties compared to corresponding binary chalcogenide glass materials lacking germanium. For instance, ternary chalcogenide glass materials containing germanium, arsenic and selenium can exhibit improved Vickers micro-hardness values and other enhanced mechanical properties while still maintaining small changes in refractive index as function of temperature. Such ternary glass materials can have a formula of $(As_ySe_z)_{[(100-x) \cdot 0.01]}Ge_x$, in which x ranges between about 1 and 5, y ranges between about 30 and 40, z ranges between about 60 and 70, and y+z=100. Methods for producing the ternary glass materials can include blending arsenic, selenium, and germanium as a melt, and cooling the melt to form the ternary glass material.

21 Claims, 9 Drawing Sheets

(56) References Cited

U.S. PATENT DOCUMENTS

| | | |
|---|---|---|
| 7,501,648 B2 | 3/2009 | Chen et al. |
| 7,570,432 B1 | 8/2009 | Yonak |
| 7,687,871 B2 | 3/2010 | Maimon |
| 7,800,095 B2 | 9/2010 | An et al. |
| 7,880,194 B2 | 2/2011 | Breitwisch et al. |
| 8,120,770 B2 | 2/2012 | Huang et al. |
| 8,178,387 B2 | 5/2012 | Cheng et al. |
| 8,306,786 B1 | 11/2012 | Lynch et al. |
| 9,293,197 B2 | 3/2016 | Baleine et al. |
| 9,340,446 B1 | 5/2016 | Baleine et al. |
| 2002/0022564 A1 | 2/2002 | Minamikawa et al. |
| 2002/0088952 A1 | 7/2002 | Rao et al. |
| 2004/0114204 A1 | 6/2004 | Klug et al. |
| 2005/0030784 A1 | 2/2005 | Johnson |
| 2005/0032623 A1 | 2/2005 | Araujo et al. |
| 2005/0137075 A1 | 6/2005 | Messerschmidt et al. |
| 2006/0051047 A1 | 3/2006 | Beall et al. |
| 2006/0068154 A1 | 3/2006 | Parce et al. |
| 2006/0097342 A1 | 5/2006 | Parkinson |
| 2006/0135341 A1 | 6/2006 | Ellison et al. |
| 2007/0045771 A1 | 3/2007 | Philipp et al. |
| 2007/0079750 A1 | 4/2007 | Miguez et al. |
| 2007/0093373 A1 | 4/2007 | Borrelli et al. |
| 2007/0116409 A1 | 5/2007 | Bryan et al. |
| 2007/0181867 A1 | 8/2007 | Hewak et al. |
| 2007/0202319 A1 | 8/2007 | Bryan et al. |
| 2009/0236079 A1 | 9/2009 | Khodadadi |
| 2011/0013287 A1 | 1/2011 | Huang et al. |
| 2011/0266445 A1 | 11/2011 | Beratan |
| 2011/0293942 A1 | 12/2011 | Cornejo et al. |
| 2012/0127562 A1 | 5/2012 | Kim et al. |
| 2012/0213270 A1 | 8/2012 | Baraniuk et al. |
| 2013/0043375 A1 | 2/2013 | Baleine et al. |
| 2014/0378818 A1 | 12/2014 | Drake et al. |
| 2015/0177426 A1 | 6/2015 | Sakoske et al. |
| 2016/0088242 A1 | 3/2016 | Baleine et al. |

OTHER PUBLICATIONS

Guo et al., "Near-and mid-infrared emissions of Dy3+ doped and Dy3+/Tm3+ co-doped lead cesium iodide modified chalcohalide glasses," Journal of Luminescence, 2014, vol. 148, p. 10-17.

Hubert, "Chalcogenide Glasses for Infrared Applications: New Synthesis Routes and Rare Earth Doping," Dissertation University of Arizona, 2012, retrieved from http://arizona.openrepository.com/arizona/handle/10150/223357, pp. 19-24, 60-62, 77-80.

Yang et al., "Glass Formation and Properties of Chalcogenides in a GeSe2—As2—Se3—PbSe System," Journal of the American Ceramic Society, May 2007, vol. 90, No. 5, pp. 1500-1503.

International Search Report and Written Opinion from PCT/US2017/28185, dated Jul. 19, 2017, 8 pages.

Non-Final Office Action dated Feb. 9, 2015, from U.S. Appl. No. 13/585,577.

Final Office Action dated May 26, 2015, from U.S. Appl. No. 13/585,577.

Notice of Allowance dated Aug. 20, 2015, from U.S. Appl. No. 13/585,577.

Non-Final Office Action dated Jul. 28, 2015, from U.S. Appl. No. 14/172,175.

Notice of Allowance dated Jan. 15, 2016, from U.S. Appl. No. 14/172,175.

Non-Final Office Action dated Jul. 29, 2016, from U.S. Appl. No. 14/518,106.

* cited by examiner

TERNARY GLASS MATERIALS WITH LOW REFRACTIVE INDEX VARIABILITY

CROSS-REFERENCE TO RELATED APPLICATIONS

Not applicable.

STATEMENT REGARDING FEDERALLY SPONSORED RESEARCH OR DEVELOPMENT

Not applicable.

FIELD

The present disclosure generally relates to glass materials and, more specifically, to glass materials having low refractive index variability with temperature, improved mechanical strength in some instances, and a wide transmission window.

BACKGROUND

Binary chalcogenide glasses can be present in a number of optical systems, such as those employing infrared imaging. Although binary chalcogenide glasses can be desirable due to their wide transmission window in the infrared region of the electromagnetic spectrum, these glass materials can present a number of challenges that are not easily overcome. Many binary chalcogenide glasses exhibit significant variation in their refractive index as a function of temperature, and certain binary chalcogenide glasses have a coefficient of thermal expansion (CTE) that is mismatched with common metals used in the housings of optical systems, such as aluminum. Since many optical systems employing binary chalcogenide glasses are expected to operate over a wide temperature range, these shortcomings can result in significant performance issues. For example, thermal variation in the refractive index can result in image distortion if imaging is not conducted at the optimal temperature of a lens. Similarly, CTE mismatch can lead to mechanical failure at extreme operating temperatures if expansion rates are significantly different. In addition, many of the binary chalcogenide glasses that do exhibit desirable optical properties have poor thermo-mechanical robustness, such as unacceptable softness and low glass transition temperatures.

AMTIR-5 (Amorphous Materials, Inc.) is among the binary chalcogenide glass compositions described in U.S. Pat. No. 6,984,598. Although this binary chalcogenide glass exhibits low refractive index variability with temperature, it has poor mechanical properties and a relatively low glass transition temperature, both of which can be problematic for incorporating this glass material in various optical systems, especially those intended for deployment in extreme operating environments.

Ternary glass compositions are also commercially available. AMTIR-1 ($Ge_{33}As_{12}Se_{55}$-Amorphous Materials, Inc.) and IRG 24 ($Ge_{10}As_{40}Se_{50}$-Schott) are illustrative examples. However, the variation in refractive index with temperature remains rather high for these materials as well.

In view of the foregoing, optical materials having low refractive index variability as a function of temperature in combination with improved mechanical properties would be of considerable interest in the art. The present disclosure satisfies the foregoing need and provides related advantages as well.

SUMMARY

In various embodiments, the present disclosure provides compositions containing a ternary glass material, in which the ternary glass material has a formula of

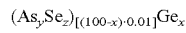

in which x ranges between about 1 and 5, y ranges between about 30 and 40, z ranges between about 60 and 70, and y+z=100.

In other various embodiments, the present disclosure provides optical structures containing a composition including a ternary glass material having a formula of

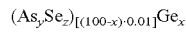

in which x ranges between about 1 and 5, y ranges between about 30 and 40, z ranges between about 60 and 70, and y+z=100.

In still other various embodiments, the present disclosure provides methods for producing a ternary glass material. The methods include blending a mixture containing about 29.7-39.6 atomic percent arsenic, about 59.4-69.3 atomic percent selenium, and about 1-5 atomic percent germanium as a melt, and cooling the melt to form a ternary glass material.

The foregoing has outlined rather broadly the features of the present disclosure in order that the detailed description that follows can be better understood. Additional features and advantages of the disclosure will be described hereinafter. These and other advantages and features will become more apparent from the following description.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1A:
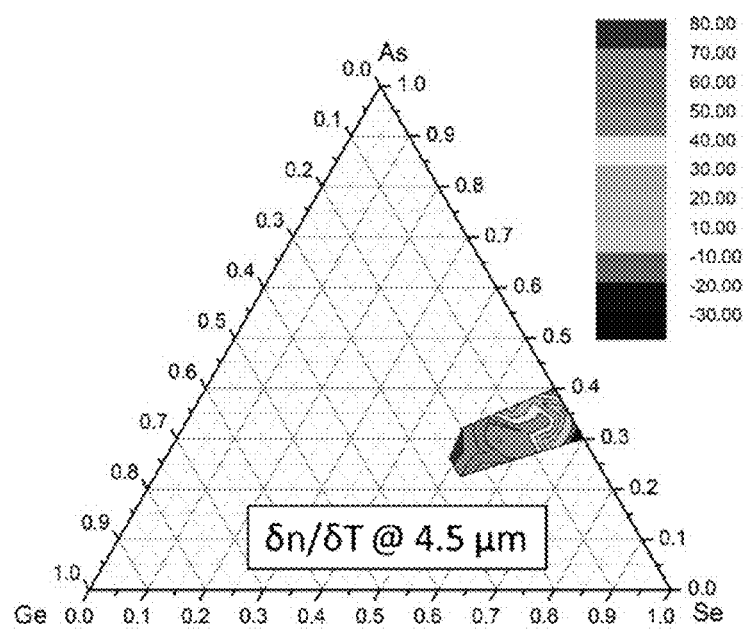
FIGS. 1A and 1B show plots illustrating the variance of refractive index as a function of composition for certain ternary glass materials described herein.

The present disclosure is directed, in part, to compositions including a ternary glass material containing arsenic, selenium and germanium. The present disclosure is also directed, in part, to lenses and other optical structures incorporating a ternary glass material containing arsenic, selenium and germanium. The present disclosure is also directed, in part, to methods for producing ternary glass materials containing arsenic, selenium and germanium.

As discussed above, binary chalcogenide glasses can be desirable for their relatively low refractive index variability as a function of temperature and their wide transmission window in the infrared region of the electromagnetic spectrum. The low refractive index variability and wide transmission window can make these glasses suitable for use in various types of optical systems, such as infrared imaging systems. However, binary chalcogenide glasses can exhibit sub-optimal mechanical properties, such as limited mechanical strength and coefficient of thermal expansion mismatch issues, which can limit their applicability in extreme operating conditions. Commercially available ternary chalcogenide glasses are believed to be similarly limited.

As used herein, the terms "index of refraction," "refractive index," and "index" synonymously refer to the velocity of electromagnetic wave propagation in a medium relative to the speed of light in a vacuum. The refractive index, n, is defined according to Formula 1, where c is the speed of light in a vacuum and v is the velocity of the electromagnetic radiation in a given medium.

$$n=c/v \qquad (1)$$

Accordingly, the slower the velocity of electromagnetic wave propagation in a given medium, the larger the refractive index becomes.

The present inventors discovered that the properties of binary chalcogenide glasses, particularly arsenic-selenium binary chalcogenide glasses having limited refractive index variability as a function of temperature, can be significantly enhanced by forming ternary chalcogenide glasses. Specifically, the inventors surprisingly discovered that by incorporating small amounts of germanium into chalcogenide glass blends that are otherwise binary in nature, the mechanical properties of the resulting ternary glass material can be significantly enhanced. Advantageously, such ternary glass materials can maintain the limited refractive index variability with temperature and wide transmission window of the parent binary chalcogenide glasses. Thus, the ternary glass materials disclosed herein can be beneficially incorporated in various types of optical systems, particularly those intended to operate in the infrared region of the electromagnetic spectrum. Although ternary chalcogenide glasses containing germanium, arsenic and selenium are known, they contain considerably lower atomic ratios of selenium and considerably higher atomic ratios of germanium than do the ternary glass materials described herein.

More specifically, the inventors discovered that compositions incorporating ternary glass materials containing arsenic and selenium and between about 1 to 5 atomic percent germanium provide improved mechanical properties compared to compositionally similar binary chalcogenide glasses. Depending upon the particular formulation of the ternary glass material, the glass transition temperature can to increase up to about 9%, the coefficient of thermal expansion can decrease by about 9%, and the micro-hardness can increase by about 25%. Optimization, balancing and even further enhancement of these properties can be realized through tailoring of the particular composition of the ternary glass material.

The inventors also discovered that a hysteresis can occur in the refractive index variability as a function of temperature depending upon how the ternary glass materials are processed. The inventors specifically discovered that as-produced ternary glass materials of the present disclosure initially exhibited different refractive index values at various temperature points during a heating cycle and subsequent cooling cycle. Similar behavior was found to occur in AMTIR-5 and similar binary chalcogenide glasses. The inventors further discovered that the hysteretic behavior could be substantially eliminated or minimized, thereby stabilizing the refractive index variability, by annealing either type of glass material below the glass transition temperature, cooling and repeating over multiple heating and cooling cycles until similar refractive index values were observed at each measurement temperature during the heating and subsequent cooling. Accordingly, the refractive index variability with temperature became more consistent following the multiple heating and cooling cycles, thereby providing more consistent optical behavior over long-term deployment at a variety of temperatures. Therefore, the inventors discovered a relatively simple technique to stabilize the refractive index variability of various types of chalcogenide glasses, which can make them even more suitable for incorporation in various optical systems and improve the performance thereof.

When the term "about" is used herein in reference to a range, both the upper endpoint of the range and the lower endpoint of the range should be understood to be modified by this term. For example, the phrase "about A to B" should be understood to present a range of about A to about B.

In various embodiments, compositions described herein include a ternary glass material containing or consisting essentially of about 1-5 atomic percent germanium, about 29.7-39.6 atomic percent arsenic, and about 59.4-69.3 atomic percent selenium. As used herein, the terms "glass" or "glass material" refer to any amorphous (i.e., at least partially non-crystalline) material that can reversibly transition from a molten state at high temperatures to a hardened state at low temperatures, while exhibiting a thermodynamic glass transition. Although silicate glasses are most commonly associated with the term "glass," where oxygen is a significant constituent, the term is to be construed more broadly herein in view of the foregoing definition. Non-oxide glasses, such as those disclosed herein, are also fully consistent with the foregoing definition of the term "glass."

Figure 1B:
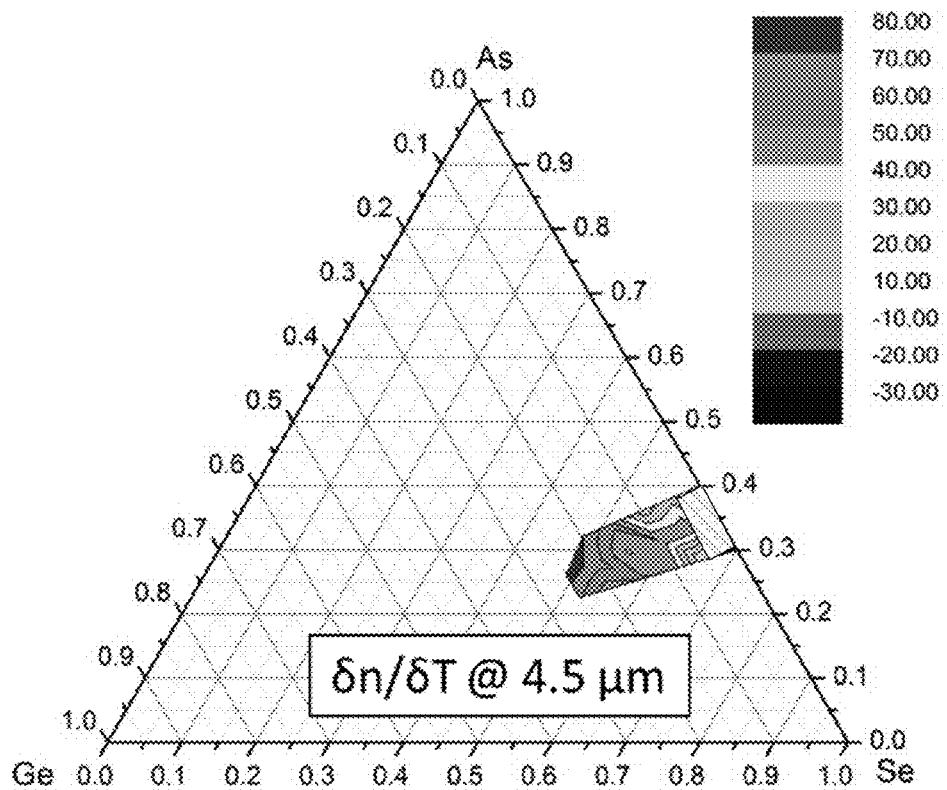

FIGS. 1A and 1B show plots illustrating the variance of refractive index as a function of composition for certain ternary glass materials described herein. The grayscale contours represent the observed refractive index variance at a wavelength of 4.5 microns. FIG. 1B highlights the approximate composition region of the ternary glass materials of the present disclosure. As can be seen from FIGS. 1A and 1B, the composition region encompassing the ternary glass materials of the present disclosure offers very low refractive index variance as a function of temperature.

More specifically, compositions of the present disclosure include a ternary glass material, in which the ternary glass material has a formula of

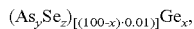

$$(As_ySe_z)_{[(100-x)\cdot 0.01]}Ge_x,$$

in which x ranges between about 1 and 5, y ranges between about 30 and 40, z ranges between 60 and 70, and y+z=100 The values of x, y and z can be any integer or non-integer value within the foregoing ranges. Accordingly, in the ternary glass materials of the present disclosure, germanium substitutes for at least a portion of the arsenic and/or selenium in binary glass materials of the form $As_ySe_z$, in which y and z are within the ranges mentioned above.

In more specific embodiments, y can range between about 30 and 35, and z can range between about 65 and 70. In further more specific embodiments, x can range between about 1 and 3, y can range between about 32.5 and 35, and z can range between about 65 and 67.5; or x can range between about 3 and 5, y can range between about 30 and 32.5, and z can range between about 67.5 and 70; or x can range between about 4 and 5, y can range between about 30 and 31, and z can range between about 69 and 70.

In other various specific embodiments, y can range between about 35 and 40, and z can range between about 60 and 65. In still other various specific embodiments, x can range between about 1 and about 3, or between about 2 and about 3.5.

As indicated above, the various ternary glass materials described can display any number of improved properties compared to binary chalcogenide glasses of otherwise similar composition but lacking germanium. Depending upon their particular composition, the ternary glass materials of the present disclosure can display one or more properties such as, for example: an index of refraction that varies by less than about 20 ppm/° C. or less than about 10 ppm/° C., having a transmission window of at least about 1 micron to about 12 microns, and/or a Vickers micro-hardness of about 1.5 GPa or greater at a 100 mN load. Suitable measurement conditions and techniques for these features will be familiar to one having ordinary skill in the art. Specific ternary glass materials demonstrating one or more of these properties will be further illustrated in the examples below.

In some embodiments, various addends can be included in the ternary glass materials to form a composite. Suitable addends are not considered to be particularly limited and can include fibers, nanoparticles, quantum dots, and the like.

In some or other embodiments, the ternary glass material can be heated and cooled multiple times below the glass transition temperature until the index of refraction remains substantially unchanged at a given temperature. That is, as alluded to above, ternary glass materials of a given composition can be thermally processed in order to stabilize the variance of their refractive index as a function of temperature, thereby minimizing hysteretic behavior. As-produced binary and ternary chalcogenide glasses that have not been thermally processed in the manner described herein are not believed to possess a stabilized index of refraction profile.

In certain embodiments, the present disclosure provides optical structures incorporating a composition containing a ternary glass material, in which the ternary glass material has a formula of

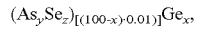

$(As_y Se_z)_{[(100-x)\cdot 0.01]} Ge_x,$ in which x ranges between about 1 and 5, y ranges between about 30 and 40, z ranges between 60 and 70, and y+z=100. In some embodiments, the optical structure can constitute a lens. Lenses incorporating the ternary glass materials described herein can be advantageous due to their broad transmission windows and enhanced mechanical properties, as discussed above. Other types of optical structures can also benefit from incorporation of the ternary glass materials described herein. Illustrative optical structures in which the presently described ternary glass materials can be incorporated include, for example, lenses, mirrors, optical fibers, optical coatings, waveguides, transformation optical components, integrated circuit optics, metamaterial optics, volume gratings, spectral filters, hybrid diffractive optical components, focal plane array optics, hybrid refractive optical components, solar collection optics, and the like.

In some embodiments, a metal can be in contact with the ternary glass material in the optical structure. In some embodiments, the metal can be aluminum. At least some of the ternary glass materials described herein can be advantageous in this regard, since they have coefficient of thermal expansion values that are similar to that of aluminum. Other metals can be chosen for use in conjunction with a particular ternary glass material to accommodate its coefficient of thermal expansion value, if necessary.

In still other various embodiments, the present disclosure provides methods for producing compositions incorporating a ternary glass material containing germanium. In various embodiments, methods of the present disclosure can include blending a mixture containing about 29.7-39.6 atomic percent arsenic, about 59.4-69.3 atomic percent selenium, and about 1-5 atomic percent germanium as a melt, and cooling the melt to form a ternary glass material. As indicated above, in more specific embodiments, the ternary glass material can have a formula of

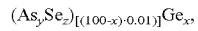

$(As_y Se_z)_{[(100-x)\cdot 0.01]} Ge_x,$ in which x ranges between about 1 and 5, y ranges between about 30 and 40, z ranges between 60 and 70, and y+z=100. Still more specific ranges for x, y and z are described in more detail hereinabove.

In more specific embodiments, batching of the arsenic, selenium, and germanium can take place together in an open silica ampule while in an oxygen-deficient atmosphere (e.g., under vacuum or using a blanket of inert gas). After evacuating using vacuum, the ampule can be sealed using a torch. The sealed ampule can then be ramped up to a melting temperature of about 700-800° C. for about 14-20 hours, for example in a rocking furnace. The melted material can then be air quenched to room temperature, and then annealed for several hours.

As also indicated hereinabove, the as-produced ternary glass materials can display a hysteresis in their refractive index variation as a function of temperature during heating and cooling ramps. Specifically, at a given temperature, the as-produced ternary glass materials can display different refractive index values depending upon whether they are being heated or cooled. This type of hysteretic behavior can be mitigated through performing one or more heating and cooling cycles upon the as-produced ternary glass material below its glass transition temperature. More specifically, methods of the present disclosure can include performing a first annealing cycle in which the ternary glass material is heated to a temperature below the glass transition temperature and then cooled, and performing one or more subsequent annealing cycles until the refractive index of the ternary glass material remains substantially unchanged at a given temperature from that of a prior annealing cycle. That is, in some embodiments of the present disclosure, multiple annealing cycles can be performed until the refractive index variability at a given temperature falls below a desired threshold value. In some embodiments, one or two annealing cycles can be performed. In other various embodiments, three annealing cycles, or four annealing cycles, or five annealing cycles, or six annealing cycles, or seven annealing cycles, or eight annealing cycles, or nine annealing cycles, or ten annealing cycles can be performed. For example, in some embodiments, a single additional annealing cycle to about 90° C. with a one-hour hold can be performed.

Suitable techniques for forming the melt or for performing the annealing cycle(s) are not considered to be particularly limited in the various embodiments of the present disclosure. Illustrative equipment can include, for example, ovens, autoclaves, furnaces, lasers, and the like. The heating technique used to form the melt and to perform the subsequent annealing cycles can be the same or different.

In various embodiments, the melt can be shaped into various forms before being cooled below the glass transition temperature and solidified into the ternary glass material. Illustrative forms can include for example, a rod, slab, fiber, preform, or a near net shape lens that is subsequently further processed (e.g., through polishing). In other embodiments, the melt can be layered upon an optical substrate. The chosen form can be dependent upon the type of optical structure into which the ternary glass material is ultimately to be incorporated. Compatibility with subsequent optical fabrication methodologies may also be considered.

EXAMPLES

Ternary glass materials having the compositions set forth in Table 1 were formed by combining elemental forms of each component and heating to form a melt. Batching of the components was performed in an open silica ampule while in an oxygen deficient atmosphere. Using a vacuum fitting and pump, the atmosphere was evacuated from the silica ampule, and the ampule was sealed using an oxygen gas torch. The sealed ampule was then placed in a rocking furnace, and ramped up to a melting temperature of about 700-800° C. for 14-20 hours. The melted material was then air quenched to room temperature, and annealed for several hours. The ternary glass materials were then annealed one or more times below the glass transition temperature and cooled until the refractive index at a given temperature was substantially unchanged between subsequent annealing cycles.

TABLE 1

| Ternary Glass | Chemical Composition (atomic percent) | | |
|---|---|---|---|
| Material | As | Se | Ge |
| 1 | 34.475 | 64.025 | 1.5 |
| 2 | 34.2125 | 63.5375 | 2.25 |
| 3 | 33.95 | 63.05 | 3.0 |
| 4 | 31.525 | 65.475 | 3.0 |
| 5 | 28.8 | 67.2 | 4.0 |
| 6 | 28.65 | 66.85 | 4.5 |

Physical property measurements were conducted through appropriate techniques and compared to two AMTIR-5 controls. The first AMTIR-5 control (AMTIR-5 Control 1) represents literature values of the as-produced binary glass material. The second AMTIR-5 control (AMTIR-5 Control 2) was processed with multiple annealing cycles until the refractive index became substantially constant at a given temperature during heating and subsequent cooling. AMTIR-5 Control 2 values represent the average of two multiply annealed samples. Table 2 summarizes the physical property measurements of Ternary Glass Materials 1-6 and the two AMTIR-5 controls.

Figure 2A:
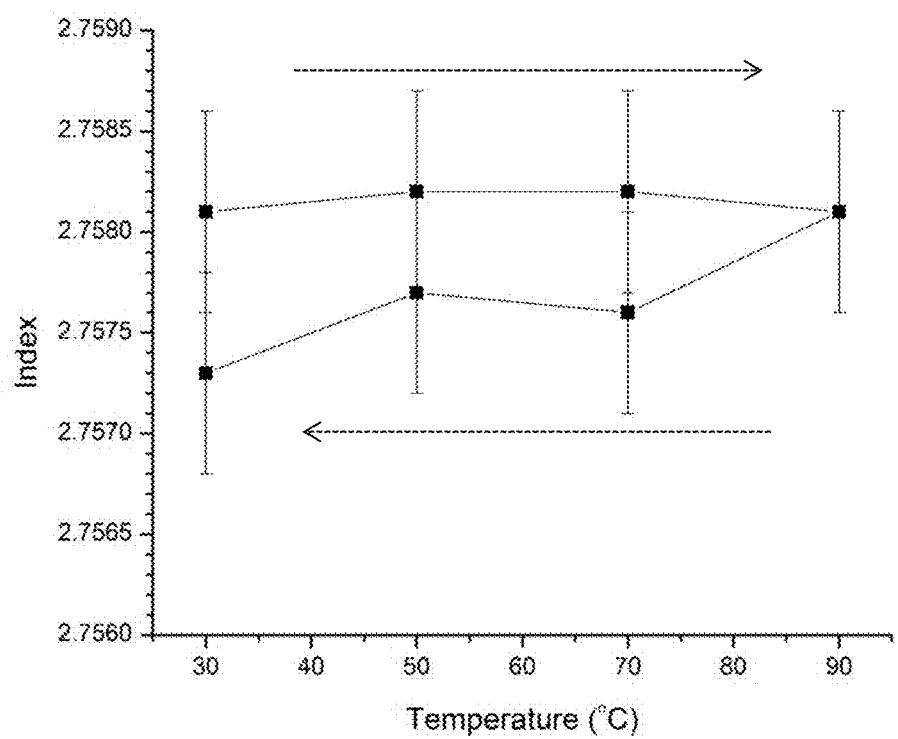
FIGS. 2A and 2B show illustrative plots of refractive index as a function of temperature for AMTIR-5 Control 2 over heating and cooling cycles.
Figure 2B:
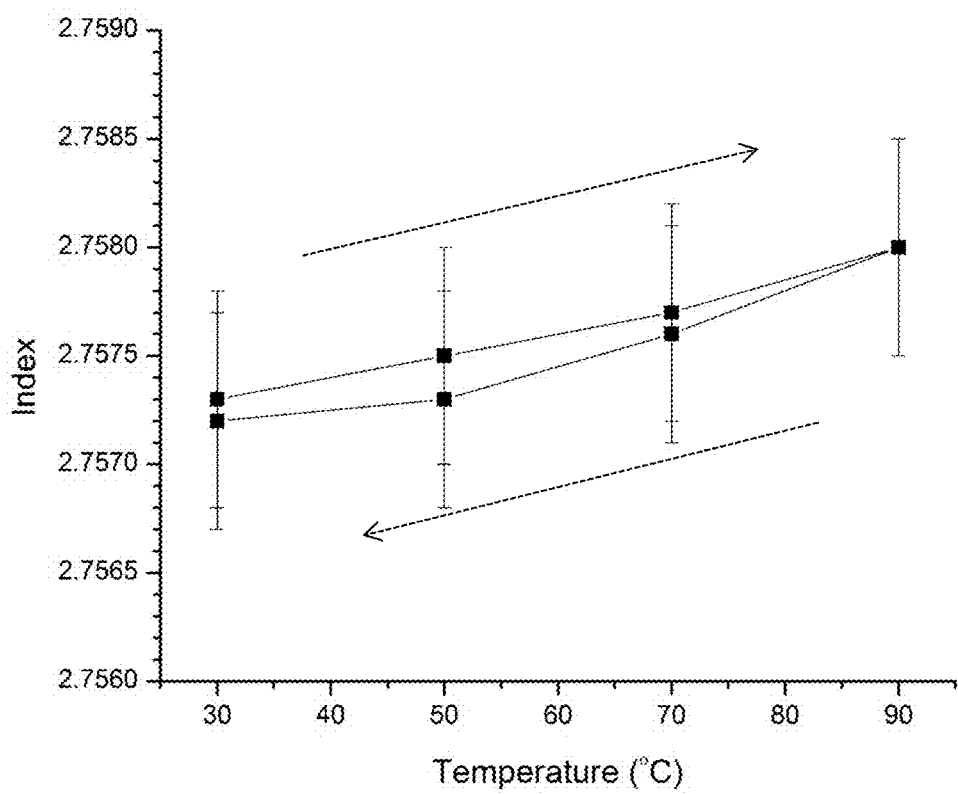
Figure 3:
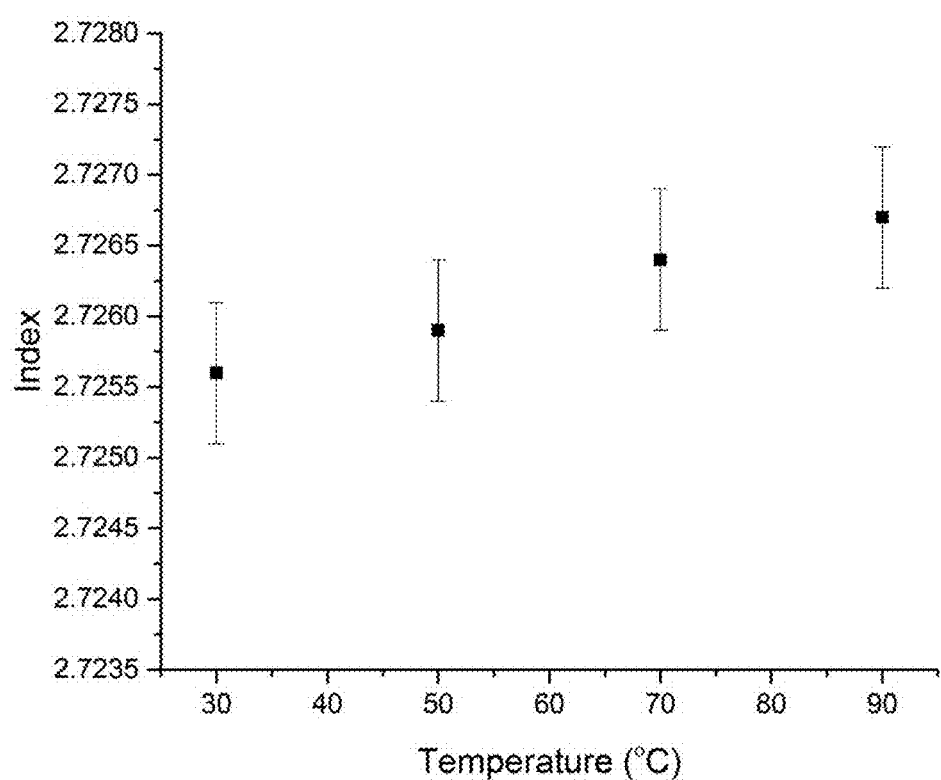
FIGS. 3-8 show illustrative plots of refractive index as a function of temperature for Ternary Glass Materials 1-6, respectively.
Figure 4:
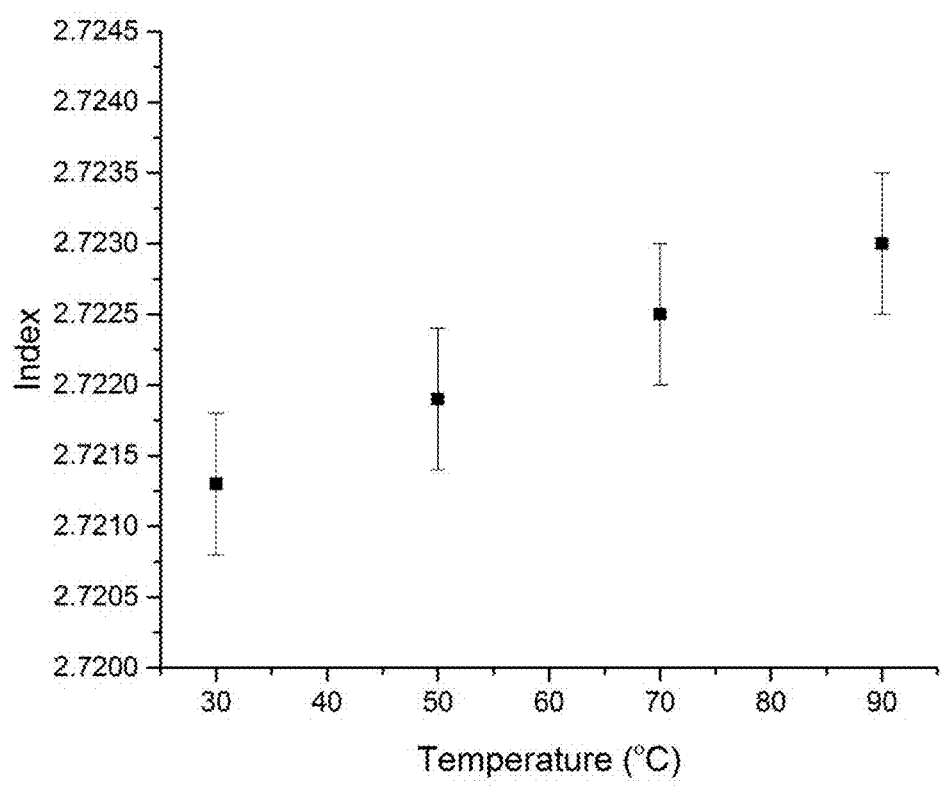
Figure 5:
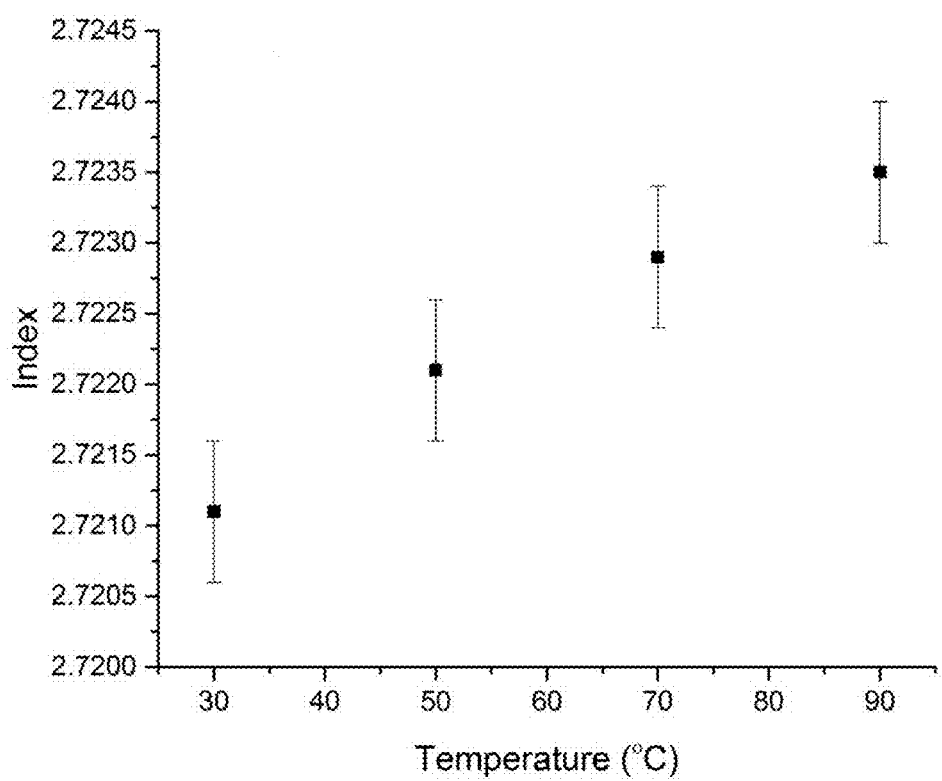
Figure 6:
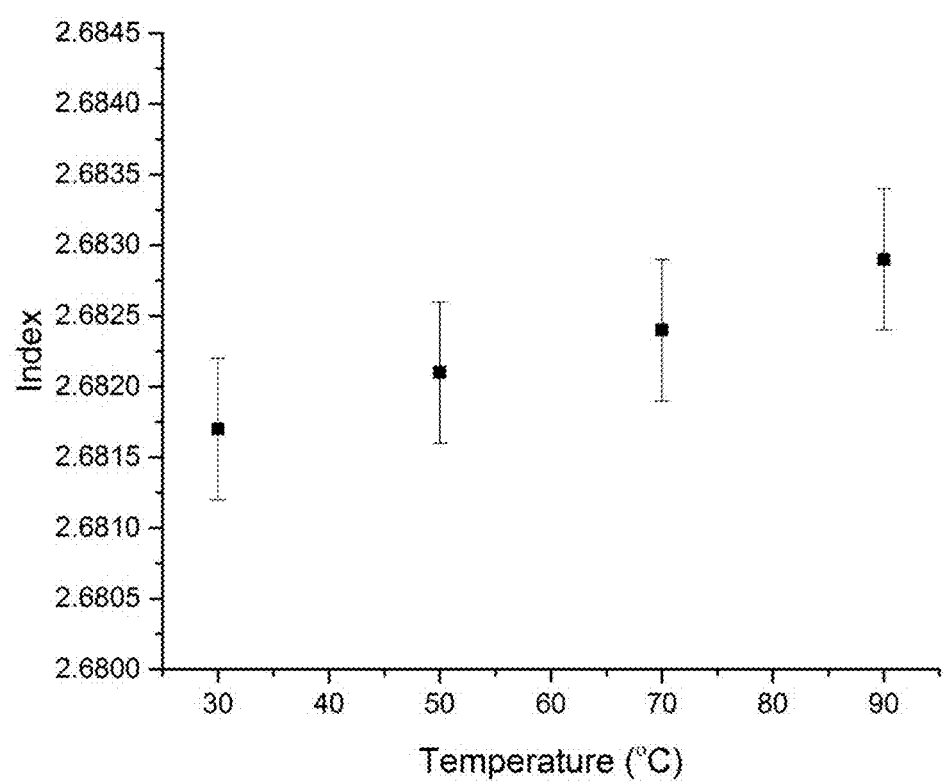
Figure 7:
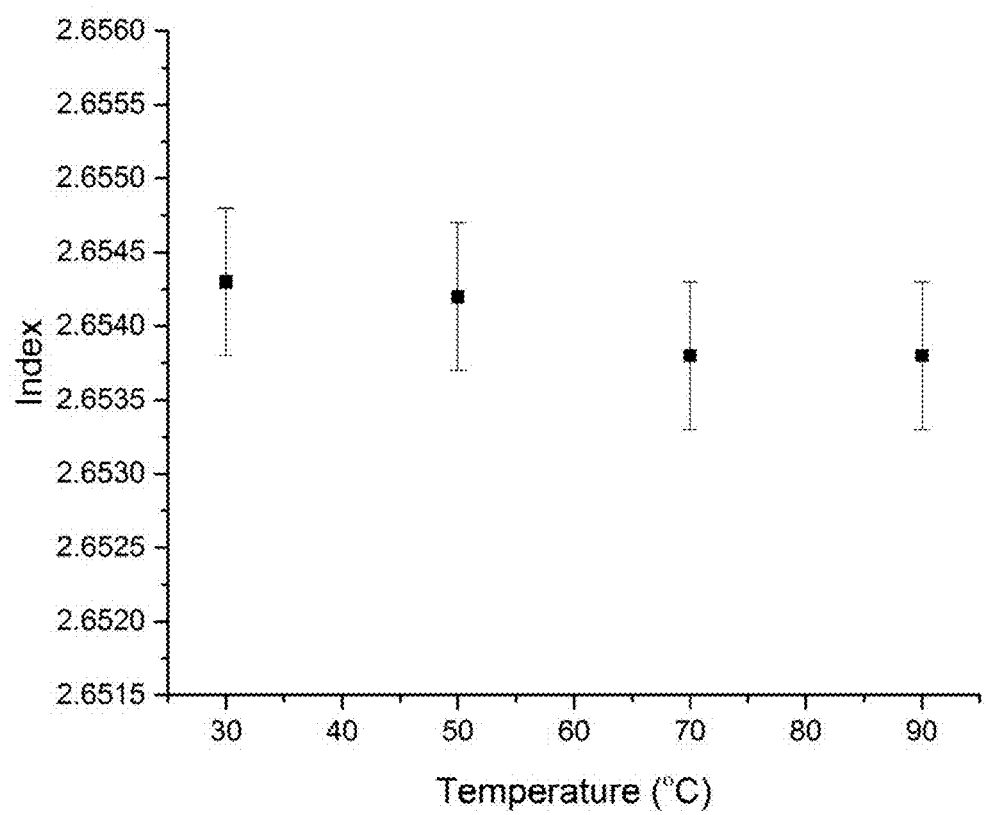
Figure 8:
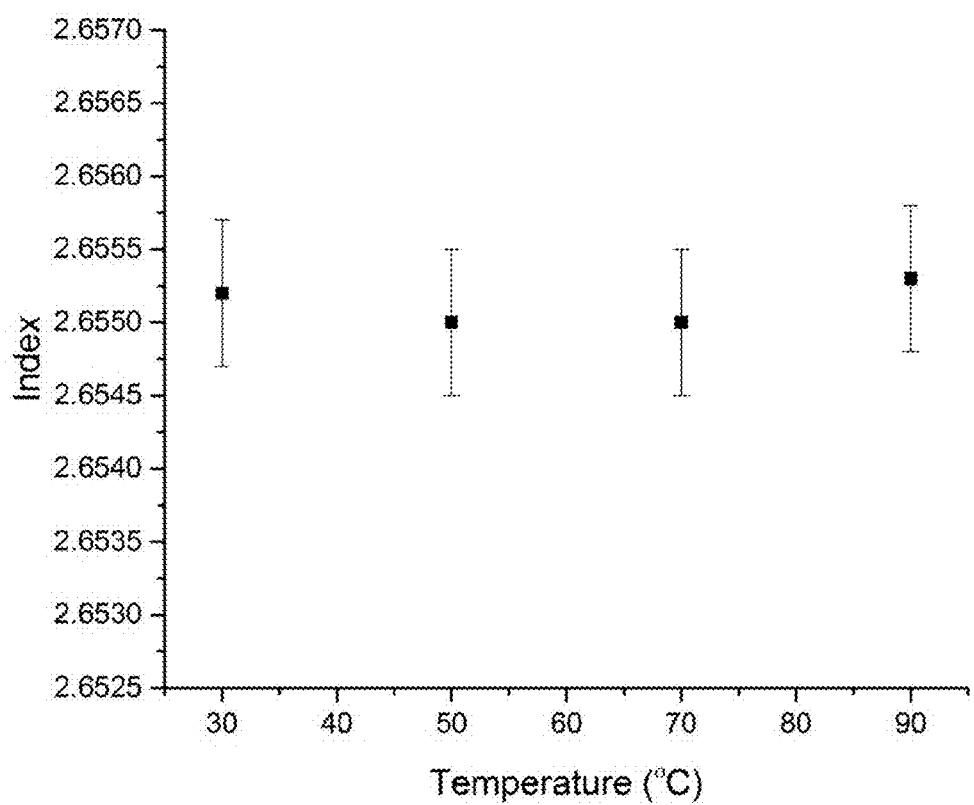

FIGS. 2A and 2B show illustrative plots of refractive index as a function of temperature for AMTIR-5 Control 2 over heating and cooling cycles. FIG. 2A shows the refractive index variance with temperature during the first heating and cooling cycle, and FIG. 2B shows the refractive index variance with temperature during the second heating and cooling cycle. In FIG. 2A, the forward and reverse curves of refractive index variance with temperature did not mirror one another. That is, there was a hysteresis. In contrast, FIG. 2B showed much less variance between the forward and reverse curves during the second heating cycle. The increase in refractive index as a function of temperature was approximately linear.

FIGS. 3-8 show illustrative plots of refractive index as a function of temperature for Ternary Glass Materials 1-6, respectively. These samples were similarly annealed one or more times below their glass transition temperatures to stabilize the refractive index variance as a function of temperature. Like the AMTIR-5 control, these samples likewise produced approximately linear variance of the refractive index as a function of temperature. As can be seen from FIGS. 7 and 8, Ternary Glass Materials 5 and 6 both provided desirably low refractive index variance below 10 ppm/° C.

Although the disclosure has been described with reference to the above embodiments, one of ordinary skill in the art will readily appreciate that these are only illustrative of the disclosure. It should be understood that various modifications can be made without departing from the spirit of the disclosure. The disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description.

What is claimed is the following:

1. A composition comprising a ternary glass material, the ternary glass material having a formula of $$(As_y Se_z)_{[(100-x) \cdot 0.01]} Ge_x;$$

wherein x ranges between about 1 and 5, y ranges between about 30 and 40, z ranges between about 60 and 70, and y+z=100.

2. The composition of claim 1, wherein the ternary glass material has an index of refraction that varies by less than about 20 ppm/° C.

TABLE 2

| | AMTIR-5 Controls | | Ternary Glass Materials | | | | | |
|---|---|---|---|---|---|---|---|---|
| Physical Property | Control 1 | Control 2 | 1 | 2 | 3 | 4 | 5 | 6 |
| Transmission Window (μm) | 1.0-12 | 1.0-12 | 1.0-12 | 1.0-12 | 1.0-12 | 1.0-12 | 1.0-12 | 1.0-12 |
| Refractive Index (4.515 μm, 30° C.) | 2.7545 | 2.7564 | 2.7256 | 2.7213 | 2.7211 | 2.6817 | 2.6538 | 2.6553 |
| dn/dT (×10$^{-6}$/° C.) (4.515 μm) | <1 | 20.2 | 19.0 | 28.5 | 40.0 | 19.5 | −1.8 | 6.0 |
| $T_g$ (° C.) | 143 | 169 | 171 | 177 | 184 | 164 | 166 | 166 |
| CTE (ppm/° C.) | 23.7 | 25.6 | 23.4 | 23.8 | 23.5 | 22.3 | 26.0 | 25.2 |
| Density (g/cm$^3$) | 4.51 | 4.63 | 4.55 | 4.56 | 4.56 | 4.54 | 4.57 | 4.52 |
| Micro-hardness, $H_v$, (GPa, 100 mN load) | 0.735 | 1.297 | 1.54 | 1.53 | 1.61 | 1.49 | 1.58 | 1.53 |

3. The composition of claim 2, wherein the ternary glass material is heated and cooled multiple times below the glass transition temperature until the index of refraction remains substantially unchanged at a given temperature.

4. The composition of claim 1, wherein the ternary glass material has a transmission window of at least about 1 micron to about 12 microns.

5. The composition of claim 1, wherein the ternary glass material has a Vickers micro-hardness of about 1.5 GPa or greater at a 100 mN load.

6. The composition of claim 1, wherein y ranges between about 30 and 35 and z ranges between about 65 and 70.

7. The composition of claim 1, wherein y ranges between about 35 and 40 and z ranges between about 60 and 65.

8. The composition of claim 1, wherein x ranges between about 1 and 3, y ranges between about 32.5 and 35, and z ranges between about 65 and 67.5.

9. The composition of claim 1, wherein x ranges between about 3 and 5, y ranges between about 30 and 32.5, and z ranges between about 67.5 and 70.

10. The composition of claim 1, wherein x ranges between about 4 and 5, y ranges between about 30 and 31, and z ranges between about 69 and 70.

11. The composition of claim 1, wherein the ternary glass material consists essentially of about 29.7-39.6 atomic percent arsenic, about 59.4-69.3 atomic percent selenium, and about 1-5 atomic percent germanium.

12. An optical structure comprising the composition of claim 1.

13. A method comprising:
blending a mixture comprising about 29.7-39.6 atomic percent arsenic, about 59.4-69.3 atomic percent selenium, and about 1-5 atomic percent germanium as a melt; and
cooling the melt to form a ternary glass material.

14. The method of claim 13, further comprising:
performing a first annealing cycle in which the ternary glass material is heated to a temperature below the glass transition temperature and then cooled; and
performing one or more subsequent annealing cycles until the refractive index of the ternary glass material remains substantially unchanged at a given temperature from that of a prior annealing cycle.

15. The method of claim 13, wherein the ternary glass material has a formula of $(As_y Se_z)_{[(100-x) \cdot 0.01]} Ge_x;$ wherein x ranges between about 1 and 5, y ranges between about 30 and 40, z ranges between about 60 and 70, and y+z=100.

16. The method of claim 15, wherein y ranges between about 30 and 35 and z ranges between about 65 and 70.

17. The method of claim 15, wherein y ranges between about 35 and 40 and z ranges between about 60 and 65.

18. The method of claim 15, wherein x ranges between about 1 and 3, y ranges between about 32.5 and 35, and z ranges between about 65 and 67.5.

19. The method of claim 15, wherein x ranges between about 3 and 5, y ranges between about 30 and 32.5, and z ranges between about 67.5 and 70.

20. The method of claim 15, wherein x ranges between about 4 and 5, y ranges between about 30 and 31, and z ranges between about 69 and 70.

21. The method of claim 13, wherein the ternary glass material consists essentially of arsenic, selenium, and germanium.

* * * * *